United States Patent
Fukano et al.

(10) Patent No.: US 9,046,182 B2
(45) Date of Patent: Jun. 2, 2015

(54) CHECK VALVE

(71) Applicant: SMC KABUSHIKI KAISHA, Chiyoda-ku (JP)

(72) Inventors: Yoshihiro Fukano, Moriya (JP); Tadashi Uchino, Moriya (JP)

(73) Assignee: SMC KABUSHIKI KAISHA, Chiyoda-ku (JP)

( * ) Notice: Subject to any disclaimer, the term of this patent is extended or adjusted under 35 U.S.C. 154(b) by 203 days.

(21) Appl. No.: 13/667,663

(22) Filed: Nov. 2, 2012

(65) Prior Publication Data

US 2013/0112302 A1    May 9, 2013

(30) Foreign Application Priority Data

Nov. 4, 2011    (JP) ................. 2011-242731

(51) Int. Cl.
*F16K 15/00* (2006.01)
*F16K 15/14* (2006.01)

(52) U.S. Cl.
CPC .................. *F16K 15/144* (2013.01)

(58) Field of Classification Search
CPC .... F16K 15/028; F16K 15/023; F16K 15/144
USPC .......... 137/843, 535, 540, 543.21, 515, 515.5
See application file for complete search history.

(56) References Cited

U.S. PATENT DOCUMENTS

| | | |
|---|---|---|
| 3,465,786 A | 9/1969 | Spisak |
| 3,508,576 A | 4/1970 | Gross |
| 6,357,468 B1 | 3/2002 | Roussel |
| 6,564,828 B1 | 5/2003 | Ishida |
| 6,948,521 B2 | 9/2005 | Fukano |
| 2003/0015678 A1 | 1/2003 | Kagomoto et al. |
| 2003/0201012 A1 | 10/2003 | Fukano |
| 2007/0034272 A1 | 2/2007 | Nicolino |

(Continued)

FOREIGN PATENT DOCUMENTS

| | | |
|---|---|---|
| CN | 101457848 A | 6/2009 |
| DE | 1 550 614 A | 11/1969 |

(Continued)

OTHER PUBLICATIONS

Office Action issued Feb. 12, 2014 in Japanese Patent Application No. 2011-242731 with partial English language translation.

(Continued)

*Primary Examiner* — John K Fristoe, Jr.
*Assistant Examiner* — Kelsey Rohman
(74) *Attorney, Agent, or Firm* — Oblon, McClelland, Maier & Neustadt, L.L.P.

(57) ABSTRACT

A check valve includes connected first and second bodies respectively disposed on upstream and downstream sides. A valve plug is disposed displaceably in a communication chamber formed in the interior of the first body. A skirt urges a main body portion of the valve plug in a direction for seating the main body portion on a valve seat surface, and is provided on the valve plug such that the main body portion is seated on the valve seat surface by an elastic force of the skirt. By supplying a pressure fluid to the first body, the valve plug is displaced in opposition to the elastic force of the skirt, whereby the interior of the first body and the interior of the second body are placed in communication and the pressure fluid is allowed to flow therethrough.

9 Claims, 7 Drawing Sheets

(56) References Cited

U.S. PATENT DOCUMENTS

| | | |
|---|---|---|
| 2009/0145497 A1 | 6/2009 | Takeda |
| 2009/0173391 A1 | 7/2009 | Choksi |

FOREIGN PATENT DOCUMENTS

| | | |
|---|---|---|
| DE | 25 21 878 A1 | 11/1976 |
| DE | 33 29 652 A1 | 2/1985 |
| DE | 10 2007 016 898 A1 | 10/2008 |
| JP | 58-81275 A | 5/1983 |
| JP | 60-34157 | 3/1985 |
| JP | 1-65990 | 4/1989 |
| JP | 5-34256 U | 5/1993 |
| JP | 7-4542 A | 1/1995 |
| JP | 7-54658 A | 2/1995 |
| JP | 3369523 | 11/2002 |
| JP | 2003-28352 | 1/2003 |
| JP | 2003-322264 | 11/2003 |
| JP | 2010-255800 | 11/2010 |
| NL | 6 604 648 A | 10/1966 |
| WO | WO 00/03167 | 1/2000 |

OTHER PUBLICATIONS

German Office Action issued Jan. 13, 2014 in Patent Application No. 10 2012 110 489.1.

French Preliminary Search Report issued Oct. 10, 2013, in Patent Application No. FR 1260450 (FA 778992).

Office Action issued Aug. 13, 2013 in Japanese Application No. 2011-242731 (With Partial English Translation).

Combined Chinese Office Action and Search Report issued Mar. 4, 2014 in Patent Application No. 201210435090.8 with English Translation.

CHECK VALVE

CROSS-REFERENCE TO RELATED APPLICATION

This application is based upon and claims the benefit of priority from Japanese Patent Application No. 2011-242731 filed on Nov. 4, 2011, of which the contents are incorporated herein by reference.

BACKGROUND OF THE INVENTION

1. Field of the Invention

The present invention relates to a check valve, which is capable of allowing a pressure fluid to flow in one direction along a flow passage while preventing flow of the pressure fluid in an opposite direction.

2. Description of the Related Art

The present applicant has proposed in Japanese Laid-Open Patent Publication No. 2003-322264 (Patent Document 1) a check valve including a body and a pair of couplings disposed on opposite end sides of the body, and which are connected detachably to a pair of fluid pressure devices. The check valve allows the pressure fluid to flow from one of the fluid pressure devices, while preventing flow of the pressure fluid from the other of the fluid pressure devices.

Further, in the check valve disclosed in Japanese Patent No. 3369523 (Patent Document 2), a valve main body is formed from an upstream side body and a downstream side body, wherein the upstream side body and the downstream side body are connected together, and a valve plug and a spring made of a synthetic resin formed in the shape of a compression coil spring are accommodated in the interior of the valve main body. The valve plug is seated on a valve seat under an elastic action of the spring. By supplying a pressure fluid to the interior of the upstream side body, the valve plug is made to separate away from the valve seat in opposition to the elastic force of the spring, and the pressure fluid is allowed to flow to the interior of the downstream side body. On the other hand, in the event that a pressure fluid is supplied to the downstream side body, since the valve plug remains seated on the valve seat and cannot be moved due to the elastic force of the spring, the pressure fluid is prevented from flowing from the downstream side body to the side of the upstream side body.

SUMMARY OF THE INVENTION

However, with the check valve according to the aforementioned Patent Document 2, although a spring in the form of a compression coil spring is used for urging the valve plug toward a valve seat, since the spring is made of a resin material, manufacturing of the spring is exceedingly complex, leading to an increase in manufacturing costs for the check valve. Further, when the valve plug is in a valve open condition, a state occurs in which the spring is compressed by the valve plug, and since spaces between the helical shaped wires of the spring are narrowed, flow passage resistance is brought about when the pressure fluid flows therethrough. As a result, the flow rate of the pressure fluid that flows from the upstream side body to the downstream side body is reduced.

Furthermore, due to flowing of the pressure fluid through and past the inner portions of the spring, unbalanced loads are applied to the spring, leading to a concern that damage may be caused to the spring.

An object of the present invention is to provide a check valve, which enables a fluid to flow smoothly by reducing resistance to flow of the fluid, together with minimizing the size of the check valve.

A check valve according to the present invention comprises a first body having a first port to which a pressure fluid is supplied, a second body connected to the first body and having a second port from which the pressure fluid is discharged, a valve plug disposed in the interiors of the first and second bodies for switching a state of communication between flow passages through which the pressure fluid flows, and elastic means for urging the valve plug toward a side of a valve seat formed in the first body, so as to seat the valve plug on the valve seat, wherein the elastic means includes a retaining member retained on the second body, and a sheet-like elastic member joined to the retaining member for urging the valve body in a direction away from the second body, and holes through which the pressure fluid can flow are formed in the elastic member.

According to the present invention, in place of providing a spring made up from a resin compression coil spring for applying a force to seat the valve plug, by providing the sheet-like elastic member having an elastic force that biases the valve plug, the structure can be simplified, along with enabling miniaturization of the check valve. Further, because holes are provided in the elastic member, even in a flow-through condition of the pressure fluid in which the valve plug is separated from the valve seat, since the pressure fluid can suitably and reliably be made to flow downstream through such holes, the pressure fluid can flow smoothly without causing resistance to flow of the pressure fluid, as in the check valve according to the conventional technique.

The above and other objects features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
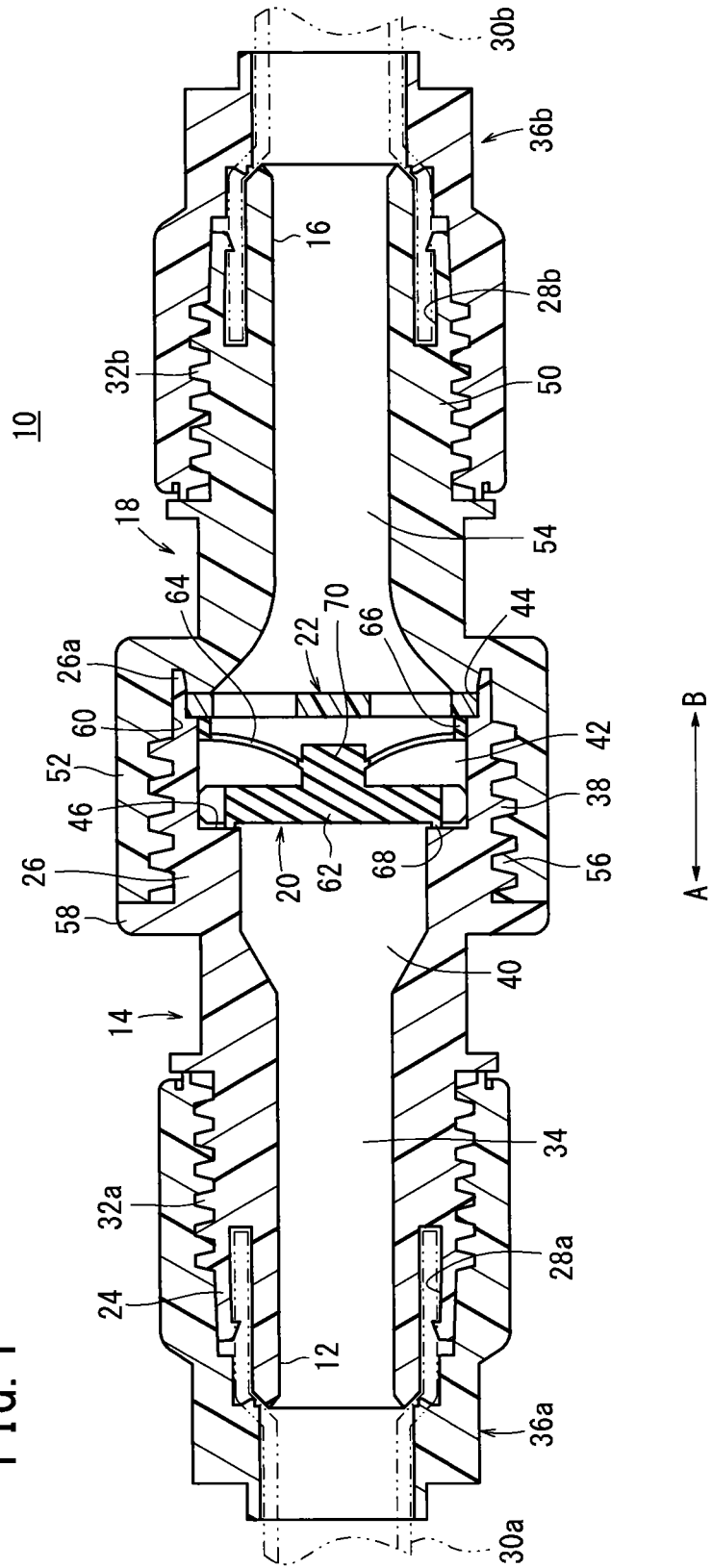
FIG. 1 is an overall cross sectional view of a check valve according to a first embodiment of the present invention.
Figure 2:
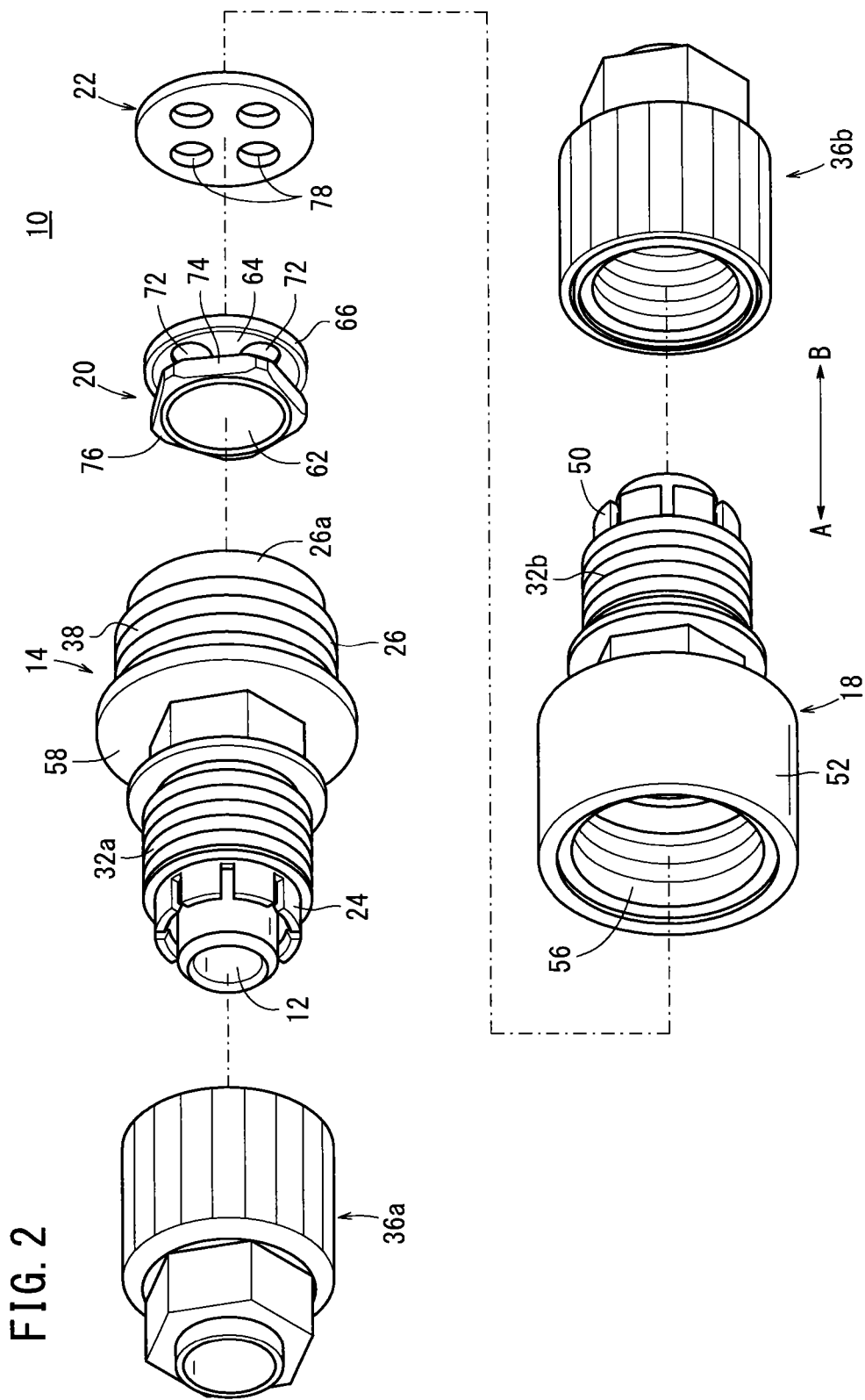
FIG. 2 is an exploded perspective view of the check valve shown in FIG. 1.

As shown in FIGS. 1 and 2, a check valve 10 according to a first embodiment comprises a first body 14 having a first port 12 to which a pressure fluid is supplied, a second body 18 having a second port 16 connected to the first body 14 and from which the pressure fluid is discharged, a valve plug 20 disposed in the interiors of the first and second bodies 14, 18, and a stopper 22 disposed in the vicinity of the valve plug 20.

More specifically, the first body 14 is provided on an upstream side (in the direction of the arrow A) to which the pressure fluid is supplied, and the second body 18 is provided on a downstream side (in the direction of the arrow B) from which the pressure fluid, having passed through the first body 14, is discharged.

The first body 14 is formed in a cylindrical shape from a resin material, for example, and comprises on one end thereof a first coupling 24 to which a tube 30a is connected, and a first connecting section 26 on the other end thereof, which is connected to the second body 18.

On the end of the first coupling 24, a tube groove 28a is formed along the axial direction (the direction of arrows A and B) of the first body 14 on the outer circumferential side of the first port 12. An end of a tube 30a, which is inserted through the aforementioned end of the first coupling 24, is inserted into and held in place in the tube groove 28a. Further, threads 32a are engraved in the vicinity of the tube groove 28a on the outer circumferential surface of the first coupling 24.

On the other hand, a first flow passage 34, which communicates with the first port 12 and extends in the axial direction (the direction of arrows A and B) with substantially the same diameter as the first port 12, is formed in the interior of the first coupling 24.

Further, in a state in which the tube 30a is inserted into the tube groove 28a, a cylindrical tightening socket 36a is inserted over the outer circumferential side of the first coupling 24 and is screw-engaged with respect to the threads 32a. Owing thereto, the tube 30a is gripped and fixed in place between the tightening socket 36a and the first coupling 24. In addition, a pressure fluid, which is supplied from the tube 30a, flows through the first flow passage 34 of the first coupling 24 and to the interior of the first body 14.

A male screw portion 38 on which threads are engraved is formed on the outer circumferential surface of the first connecting section 26, and a later-described second connecting section 52 of the second body 18 is screw engaged on the outer circumferential side thereof. The male screw portion 38 is formed, for example, as a trapezoidal screw with screw peaks having a trapezoidal shape in cross section. On the other hand, on an inner portion of the first connecting section 26, there are provided a second flow passage 40, which expands gradually in diameter from the first flow passage 34, a communication chamber 42, which is expanded in diameter with respect to the second flow passage 40, and a stopper mounting portion 44, which is expanded in diameter with respect to the communication chamber 42.

The communication chamber 42 is formed in a stepped manner with respect to the second flow passage 40, and is formed with a substantially constant diameter having a predetermined length toward the other end side (in the direction of the arrow B) of the first body 14. An annular valve seat surface (valve seat) 46 is formed in the communication chamber 42, the valve seat surface 46 extending perpendicularly to the direction of extension of the first and second flow passages 34, 40 at the border between the communication chamber 42 and the second flow passage 40.

Further, the stopper mounting portion 44 is disposed in the first body 14 at a location most proximate to the other end side (in the direction of the arrow B) thereof. The stopper mounting portion 44 is formed in an annular shape with a substantially constant diameter.

Figure 3A:
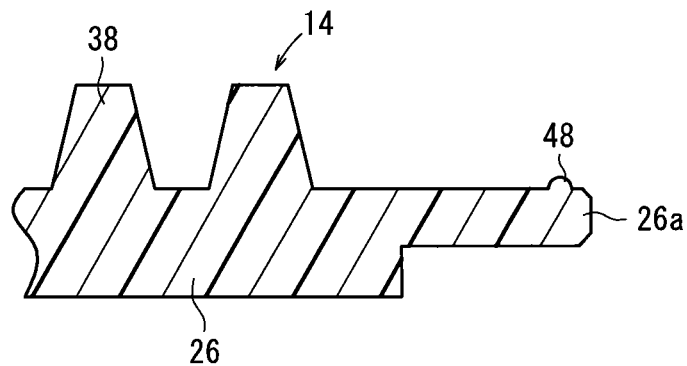
FIG. 3A is an enlarged cross sectional view of a distal end portion of a first connecting section provided on a first body.
Figure 3B:
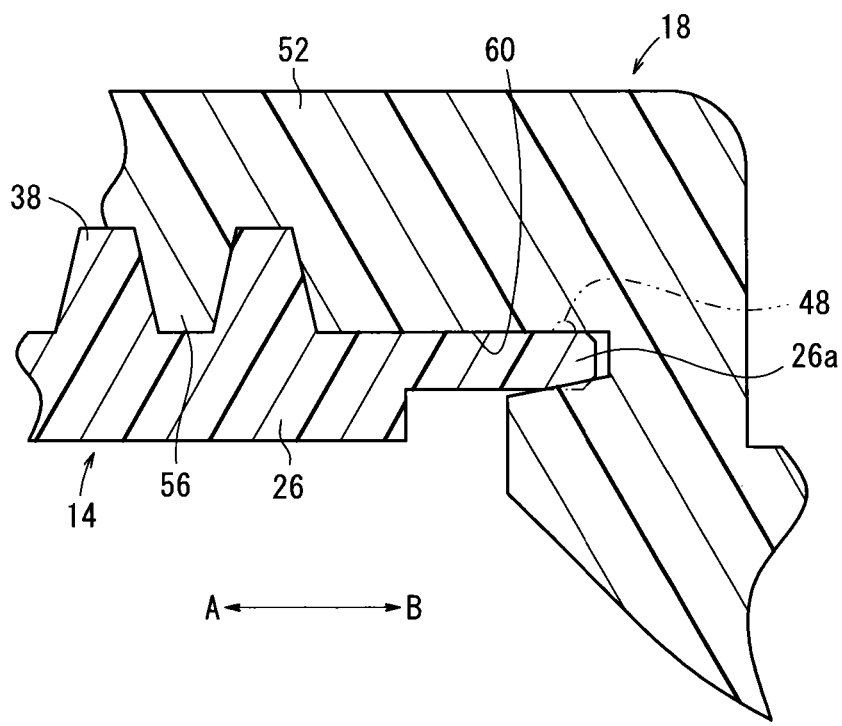
FIG. 3B is an enlarged cross sectional view showing a state in which the first connecting section shown in FIG. 3A is connected to a second connecting section provided on a second body.

As shown in FIGS. 3A and 3B, a projection 48, which bulges outwardly in an annular shape, is formed on the outer circumferential surface of the distal end 26a of the first connecting section 26. When the second body 18 is mounted on the outer circumferential side thereof, the projection 48 is crushed when placed in sliding contact with the inner circumferential surface of the second connection section 52 (to be described later) in the second body 18. Owing thereto, an airtight condition between the inner circumferential surface of the second body 18 and the outer circumferential surface of the first body 14 is maintained reliably by the projection 48 (see FIG. 3B).

Similar to the first body 14, the second body 18 is formed, for example, in a cylindrical shape from a resin material, and comprises on one end thereof a second coupling 50 to which a tube 30b is connected, and a second connecting section 52 formed on the other end, which is connected to the first body 14.

A tube groove 28b is formed on one end of the second coupling 50 along the axial direction (the direction of arrows A and B) of the second body 18. An end of the tube 30b, which is inserted through the aforementioned one end, is inserted into the tube groove 28b and held in place therein. Further, on the outer circumferential surface of the second coupling 50, threads 32b are engraved in the vicinity of the tube groove 28b.

On the other hand, in the interior of the second coupling 50, after extending for a predetermined length at a substantially constant diameter along the axial direction, a third flow passage 54 is formed, which expands in diameter gradually toward the second connecting section 52.

Additionally, in a condition in which the tube 30b is inserted into the tube groove 28b, a cylindrical tightening socket 36b is inserted over the outer circumferential side of the second coupling 50 and is screw-engaged with respect to the threads 32b. Owing thereto, the tube 30b is gripped and fixed in place between the tightening socket 36b and the second coupling 50. In addition, a pressure fluid, which flows through the third flow passage 54 of the second body 18, flows through the second connecting section 52 and into the tube 30b.

A female screw portion 56 on which threads are engraved is formed on the inner circumferential surface of the second connecting section 52, such that the first body 14 and the second body 18 are connected integrally by screw-engagement thereof with the male screw portion 38 formed on the first connecting section 26 of the first body 14. At this time, further displacement in the axial direction (in the direction of the arrow A) is restricted by abutment of the other end of the second body 18 against an annular flange 58 that is formed on the outer circumferential side of the first body 14. Moreover, similar to the male screw portion 38, the female screw portion 56 is formed, for example, as a trapezoidal screw with screw peaks having a trapezoidal shape in cross section.

Further, a press-insertion groove 60, into which the distal end 26a of the first connecting section 26 is press-inserted when the first body 14 and the second body 18 are connected together, is provided on the second connecting section 52. The press-insertion groove 60 is formed with a tapered shape that tapers in a direction (the direction of the arrow B) away from the first body 14.

As shown in FIGS. 1, 2, 4A and 4B, the valve plug 20 is formed, for example, from a resin material, and is made up from a disk shaped main body portion 62, which is disposed in the communication chamber 42 of the first body 14, a skirt (elastic member) 64 that is gradually expanded in diameter in a radial outward direction from the center of the main body portion 62, and a leg (retaining member) 66 formed on the outer edge of the skirt 64, which abuts against a later-described stopper 22.

The main body portion 62 is disposed for displacement along the axial direction (the direction of arrows A and B) in the interior of the communication chamber 42. A seating section 68, which projects in an annular shape, is formed on one end of the main body portion 62, the seating section 68 abutting against the valve seat surface 46 of the communication chamber 42. More specifically, the diameter of the seating section 68 is set to be greater than the diameter of the second flow passage 40.

Further, on the other end of the main body portion 62, a columnar shaped bulging part 70 is formed that projects from the center thereof, the skirt 64 extending in a radial outward direction from the outer circumferential surface of the bulging part 70.

The skirt 64 is formed as a thin film (sheet like shape) having a certain elasticity, with a plurality of (e.g., four) first holes (holes) 72 the centers of which are arranged on one concentric circle. The first holes 72 are formed to penetrate through the skirt 64 and are separated mutually by equal distances in a circumferential direction.

Furthermore, in a valve closed state in which the main body portion 62 is seated on the valve seat surface 46, the skirt 64 is formed with a curved shape in cross section interconnecting the bulging part 70 and the leg 66.

On the other hand, a plurality of cutout portions 74, which are cut out in linear shapes, are formed at equal intervals in the circumferential direction on the outer circumferential surface of the main body portion 62. The cutout portions 74, and arcuately shaped arcuate sections 76 are arranged alternately around the main body portion 62. In addition, the arcuate sections 76 of the main body portion 62 are formed with roughly the same diameter as the inner circumferential surface of the communication chamber 42, with intervals being formed between the cutout portions 74 and the inner circumferential surface.

The leg 66 is formed in an annular shape with a predetermined height along the axial direction of the valve plug 20, the outer circumferential surface thereof abutting against the inner circumferential surface of the communication chamber 42, and the edge of the leg 66 abutting against an end surface of the stopper 22. Additionally, with the valve plug 20, the skirt 64 provides an elastic force to bend about the leg 66, i.e., with the leg 66 acting as a fulcrum, the elastic force urging the main body portion 62 in a direction (the direction of the arrow A) away from the leg 66, such that the main body portion 62 is normally pressed into abutment against the valve seat surface 46 of the communication chamber 42. Stated otherwise, the skirt 64 functions as an elastic member for urging the main body portion 62 in a direction (the direction of the arrow A) to be seated on the valve seat surface 46.

The stopper 22, is formed, for example, in a disk shape from a resin material having a predetermined thickness, and is formed with a plurality of (e.g., four) second holes 78 therein, the centers of which are arranged on one concentric circle. The second holes 78 are formed to penetrate through the stopper 22 and are arranged mutually with equal intervals therebetween along the circumferential direction.

In addition, the stopper 22 is mounted on the stopper mounting portion 44 of the first body 14, and by being held in engagement (abutment) with the end surface of the stopper mounting portion 44, the stopper 22 is positioned in the axial direction (the direction of arrows A and B) in the first body 14. Together therewith, when the second body 18 is connected with respect to the first body 14, by abutment of the stopper 22 against the stepped portion 80 of the second body 18, the stopper 22 is sandwiched and fixed between the stepped portion 80 and the stopper mounting portion 44.

Because the plurality of second holes 78 penetrate through the stopper 22, the communication chamber 42 and the third flow passage 54 normally are maintained in a state of communication through the second holes 78.

The check valve 10 according to the first embodiment of the present invention is constructed basically as described above. Next, operations and advantageous effects of the check valve 10 shall be explained. A condition is assumed in which a tube 30a, which is connected to a non-illustrated pressure fluid supply source, is connected beforehand to the first body 14 of the check valve 10, and another tube 30b, which is connected to a fluid pressure device (not shown) capable of being operated under the supply of a pressure fluid thereto, is connected beforehand to the second body 18.

Figure 4A:
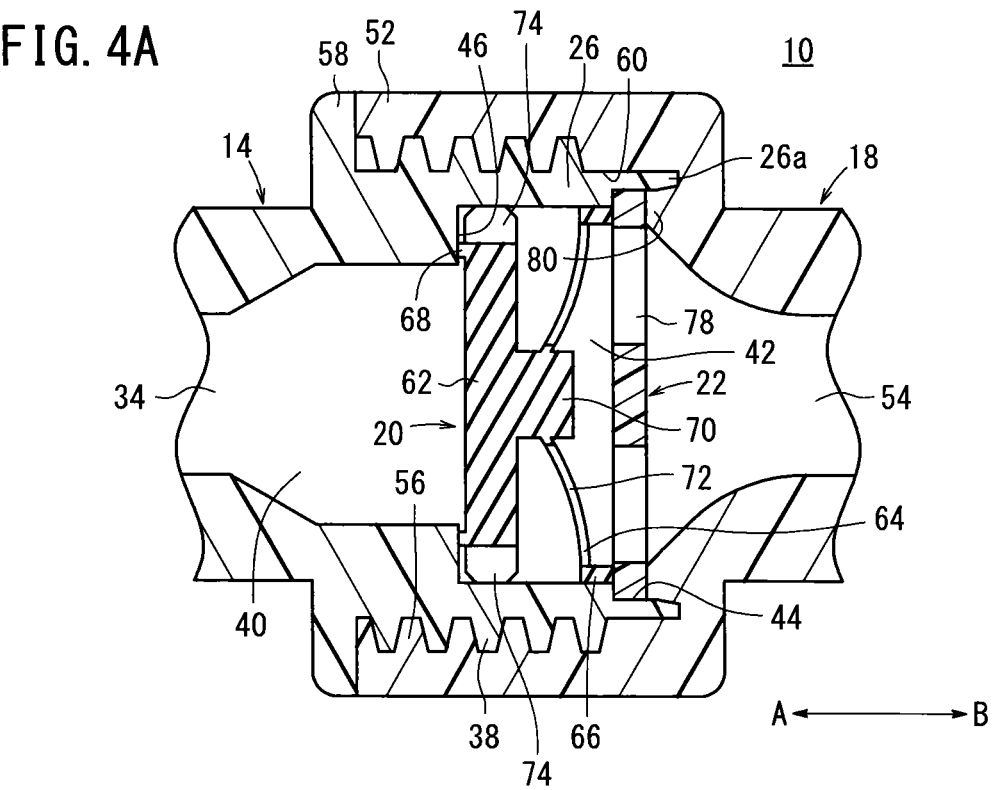
FIG. 4A is an enlarged cross sectional view of the vicinity of a valve plug in the check valve of FIG. 1.
Figure 4B:
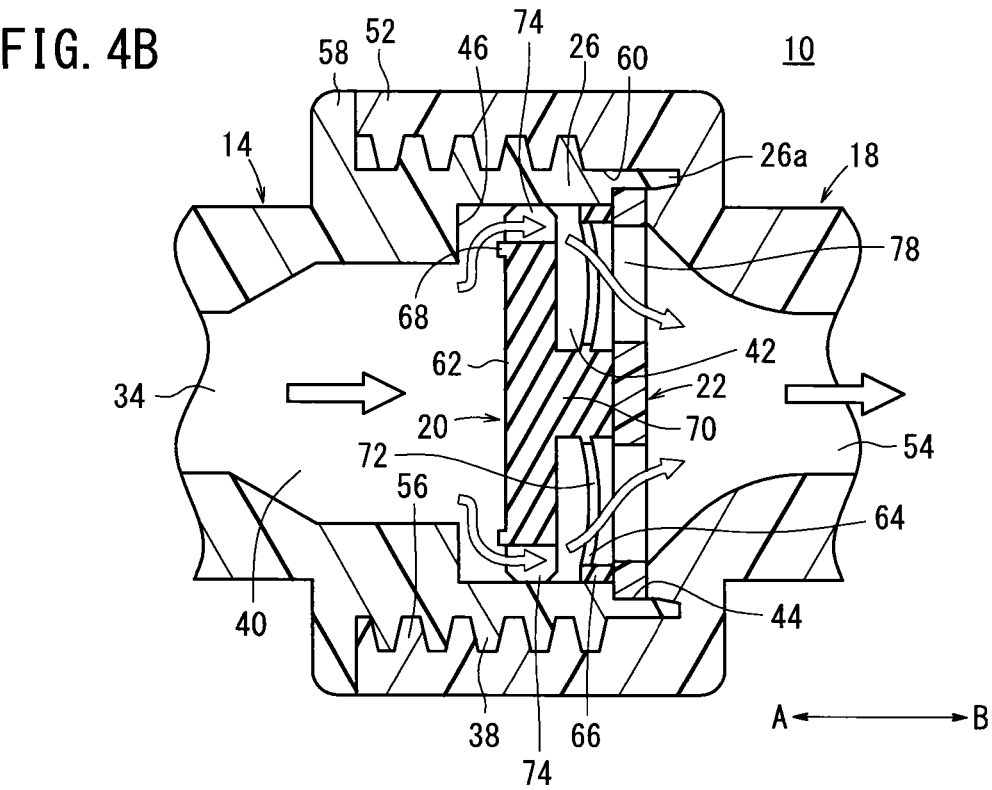
FIG. 4B is an enlarged cross sectional view showing a valve open condition in which the valve plug shown in FIG. 4A is separated from a valve seat surface.

Initially, in a valve closed state, in which the seating section 68 of the valve plug 20 shown in FIGS. 1 and 4A is seated on the valve seat surface 46, and communication between the first and second flow passages 34, 40 of the first body 14 and the third flow passage 54 of the second body 18 is blocked, when a pressure fluid is supplied to the first body 14 from the upstream side tube 30a, after the pressure fluid has flowed into the first flow passage 34 and the second flow passage 40, the main body portion 62 of the valve plug 20 is pressed (in the direction of the arrow B) toward the side of the second body 18. As a result, the valve plug 20 is moved toward the side of the stopper 22 (in the direction of the arrow B) in opposition to the elastic force of the skirt 64, whereupon the seating section 68 separates away from the valve seat surface 46. Thus, the pressure fluid flows from the second flow passage 40 and through gaps between the cutout portions 74 of the valve plug 20 and the communication chamber 42, and flows into the interior of the communication chamber 42. At this time, as shown in FIG. 4B, displacement of the valve plug 20 is restricted by abutment of the end face of the bulging part 70 against the stopper 22.

In addition, the pressure fluid, after having flowed from the interior of the communication chamber 42 through the first holes 72 of the skirt 64, the second holes 78 of the stopper 22, and the third flow passage 54 of the second body 18, is supplied to a non-illustrated fluid pressure device through the tube 30b that is connected to the second coupling 50.

Next, a case shall be described in which, for some reason, the pressure fluid attempts to flow in a reverse direction from the second body 18 toward the side of the first body 14 (in the direction of the arrow A). In this case, the first and second flow passages 34, 40 of the first body 14 remain open to atmosphere without pressure fluid being supplied thereto.

For example, when a pressure fluid is supplied from the downstream side tube 30b to the third flow passage 54 of the second body 18, the pressure fluid passes through the second holes 78 of the stopper 22 and the first holes 72 of the skirt 64 in the valve plug 20, and then flows into the communication chamber 42.

At this time, the main body portion 62 of the valve plug 20 is pressed toward the side of the first body 14 (in the direction of the arrow A) by the elastic force of the skirt 64 while also being pressed toward the side of the first body 14 (in the direction of the arrow A) by the pressure fluid. Consequently, the valve seating section 68 of the valve plug 20 is seated on the valve seat surface 46, and a valve closed condition is maintained in which communication between the communication chamber 42 and the second flow passage 40 of the first body 14 is blocked (see FIGS. 1 and 4A).

As a result, even in the case that pressure fluid is supplied from the second body 18, because the valve plug 20 is reliably maintained in a valve closed condition by the elastic force of the skirt 64, the pressure fluid is prevented from flowing to the first and second flow passages 34, 40 of the first body 14.

Stated otherwise, only in the event that pressure fluid flows from the side of the first body 14 on the upstream side, the valve plug 20 is made to separate away from the valve seat surface 46 by the pressure of the pressure fluid. Further, in the case that pressure is not applied thereto, the valve plug 20 remains seated on the valve seat surface 46 due to the elastic force of the skirt 64.

In this manner, with the first embodiment, in place of providing a spring in the form of a compression coil spring made of a resin material for applying a pressing force to seat the valve plug 20, the skirt 64 is provided integrally with the main body portion 62 of the valve plug 20, the skirt 64 exhibiting an elastic force and being made from a resin material. Thus, the elastic force of the skirt 64 is applied reliably and appropriately with respect to the main body portion 62, whereby the seating section 68 of the main body portion 62 can be seated on the valve seat surface 46. As a result, compared to the conventional check valve in which a resin spring is provided and an elastic force from the spring is used for seating the valve plug 20, the structure can be simplified and the scale of the check valve 10 can be minimized, together with enabling a reduction in manufacturing costs.

Further, by providing the plural first holes 72 in the skirt 64, even in a valve open condition in which the valve plug 20 is separated from the valve seat surface 46, the pressure fluid can reliably pass through the first holes 72 and flow toward the downstream side. Therefore, the pressure fluid can flow smoothly at a desired flow rate without causing a reduction in the flow rate of the pressure fluid, as in the check valve according to the conventional technique.

Furthermore, because the male screw portion 38 formed on the first connecting section 26 of the first body 14, and the female screw portion 56 formed on the second connecting section 52 of the second body 18 are formed respectively as trapezoidal screws, when the first connecting section 26 and the second connecting section 52 are screw-engaged and connected together, the connection therebetween can reliably and firmly be accomplished, while at the same time, loosening of the connection between the male screw portion 38 and the female screw portion 56 can be suppressed.

Still further, in the first body 14, the projection 48, which bulges outwardly in an annular shape on the distal end 26a of the first connecting section 26, is provided on the outer circumferential surface, and by providing the press-insertion groove 60, into which the distal end 26a is press-inserted, on the second connecting section 52 of the second body 18, when the first body 14 and the second body 18 are screw-engaged and connected together, the projection 48 is pressed and deformed in sliding contact with the inner circumferential surface of the second connecting section 52, whereas the distal end 26a of the first connecting section 26 is press-inserted and deformed in the press-insertion groove 60. Thus, the first connecting section 26 and the second connecting section 52 can be connected together more reliably and more firmly, while sealing between the first connecting section 26 and the second connecting section 52 is achieved, whereby pressure fluid can be prevented from leaking out through the connection region between the first body 14 and the second body 18.

Moreover, in the first embodiment, a configuration is provided in which the distal end 26a of the first connecting section 26 of the first body 14 is press-inserted into the press-insertion groove 60 of the second body 18. However, the present invention is not limited to such a structure. For example, a press-insertion groove may be disposed in the first connecting section 26, and in the second body 18, by providing a projection on a distal end portion of the second connecting section 52, the distal end portion may be press-inserted into the press-insertion groove to effect sealing.

Further, by forming the skirt 64, which functions as an elastic member, integrally with the valve plug 20, it is possible to assemble and install the skirt 64 (elastic member) at the same time that the valve plug 20 is assembled with respect to the first and second bodies 14, 18, thereby enabling the number of assembly steps to be reduced along with reducing the number of component parts.

Figure 5:
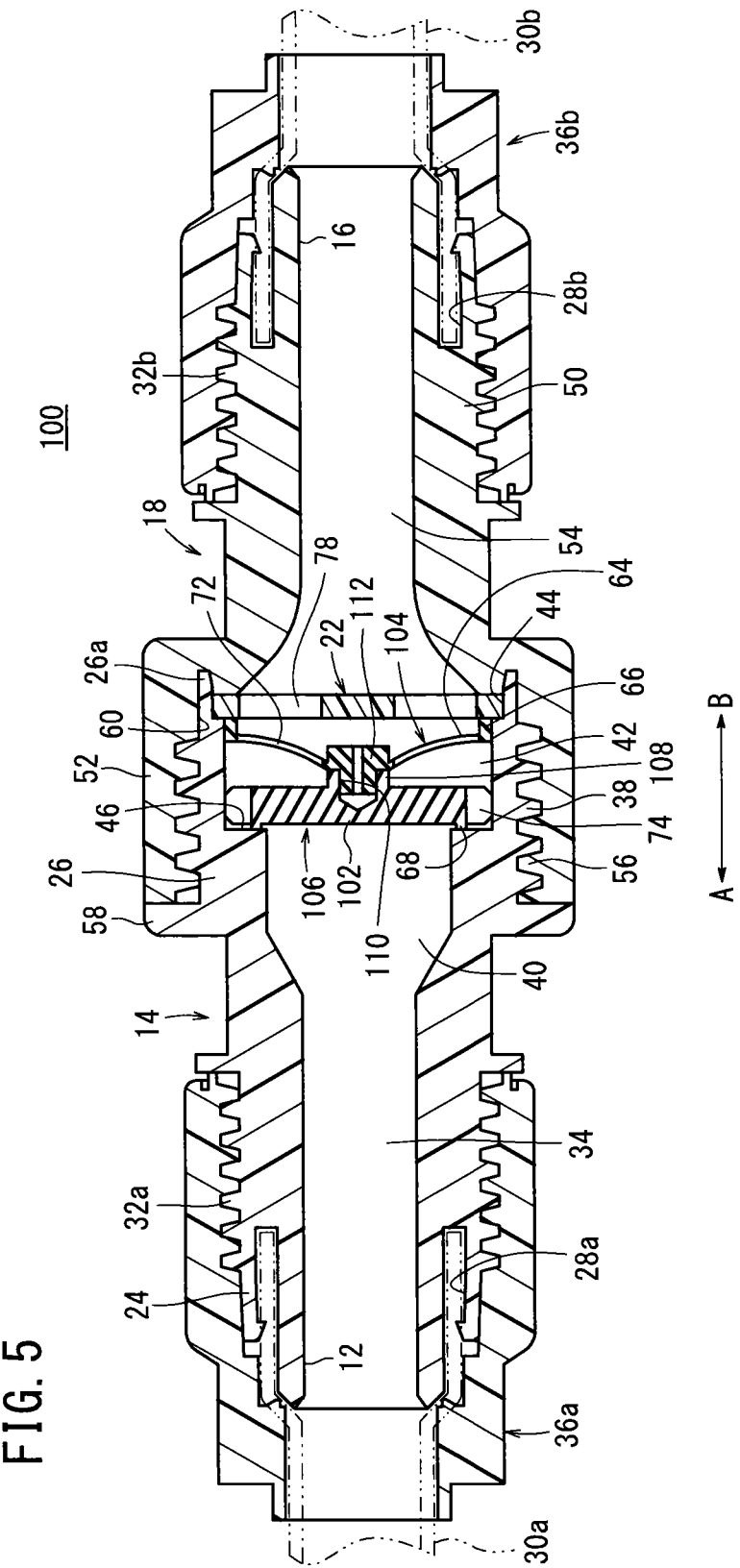
FIG. 5 is an overall cross sectional view of a check valve according to a second embodiment of the present invention.
Figure 6:
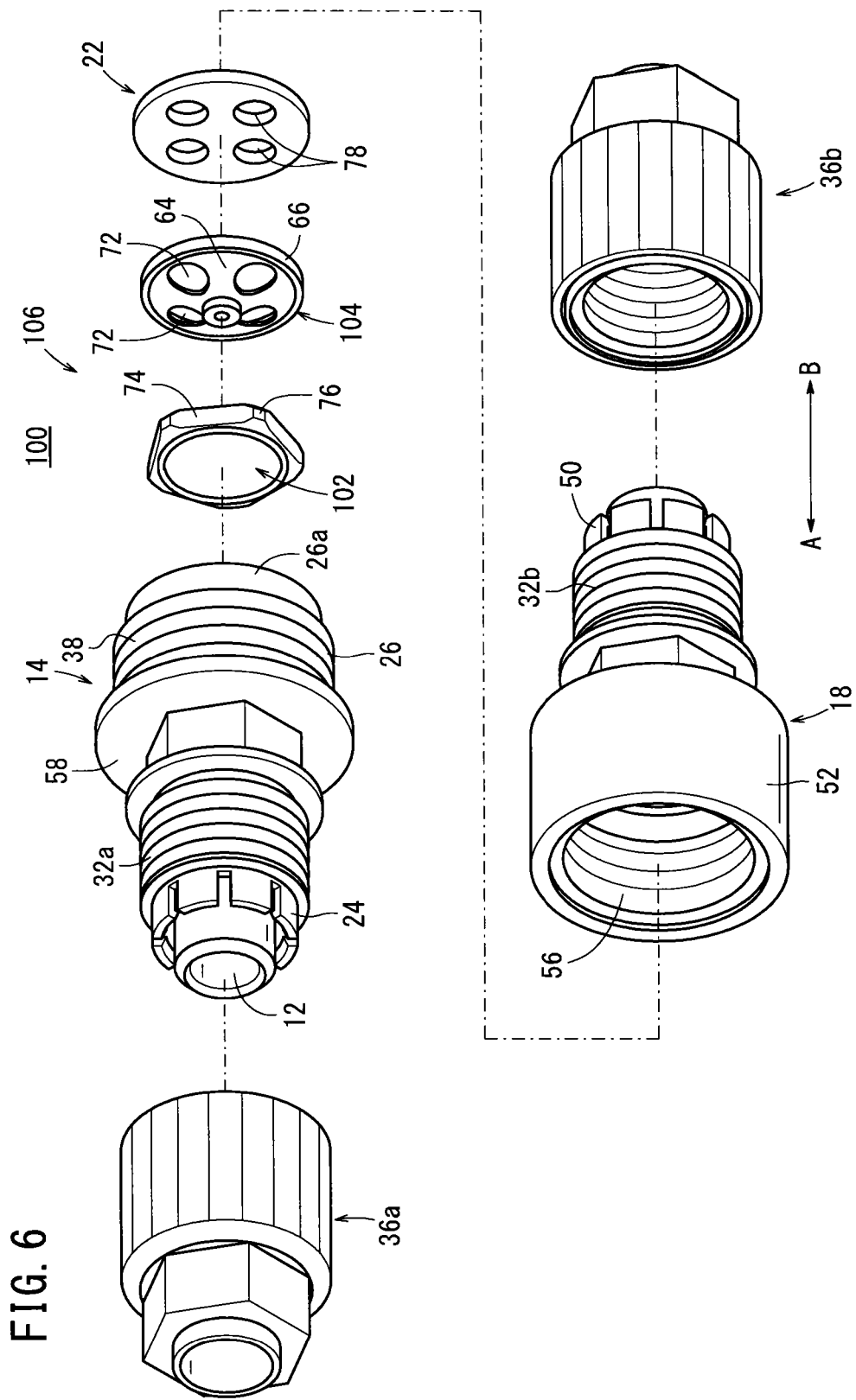
FIG. 6 is an exploded perspective view of the check valve shown in FIG. 5.

Next, a check valve 100 according to a second embodiment is shown in FIGS. 5 and 6. Structural elements thereof, which are the same as those of the aforementioned first embodiment, are designated by the same reference characters and detailed explanations of such features are omitted.

As shown in FIGS. 5 and 6, the check valve 100 according to the second embodiment differs from the check valve 10 of the first embodiment, in that the valve plug 106 thereof is constituted from a disk shaped main body portion 102, and an elastic member 104, which is formed separately from the main body portion 102 and is connected to the main body portion 102.

The valve plug 106 constituting the check valve 100 comprises the main body portion 102 having an annular seating section 68, and the elastic member 104, which is fitted into a fitting hole 110 formed in a bulging part 108 of the main body portion 102. The elastic member 104 comprises a fitting section 112 provided in the center of the elastic member 104, and which is fitted into the fitting hole 110, a skirt 64 that is expanded in diameter in a radial outward direction from the outer circumferential surface of the fitting section 112, and a leg 66 that is formed on the outer edge of the skirt 64.

The fitting hole 110 is formed with a predetermined depth from the end surface of the bulging part 108, such that by insertion of the columnar shaped fitting section 112 into the fitting hole 110, the fitting section 112 being formed with a diameter that is the same as or slightly larger than the diameter of the fitting hole 110, the elastic member 104 is connected integrally with respect to the main body portion 102.

In addition, the main body portion 102 of the valve plug 106 is pressed toward the side of the second body 18 (in the direction of the arrow B) by pressure fluid supplied to the first body 14. Further, by the main body portion 102 being moved in a direction to separate away from the valve seat surface 46 in opposition to the elastic force of the elastic member 104, the first and second flow passages 34, 40 of the first body 14 and the third flow passage 54 of the second body 18 are brought into communication with each other through the communication chamber 42.

In this manner, according to the second embodiment, a structure is provided in which the valve plug 106 is formed respectively and separately from the main body portion 102 and the elastic member 104, which are assembled mutually together. In comparison with a case in which the main body portion 102 and the elastic member 104 are formed integrally, the second embodiment makes it easier to manufacture a check valve, and then enables manufacturing costs to be reduced, whereby a low cost check valve 100 can be manufactured.

Further, in the valve plug 106, by constructing the main body portion 102 and the elastic member 104 separately, the main body portion 102 and the elastic member 104 can be formed from different materials, and thus, the materials can easily be changed, for example, corresponding to the types of pressure fluids that flow through the valve plug 106.

Figure 7:
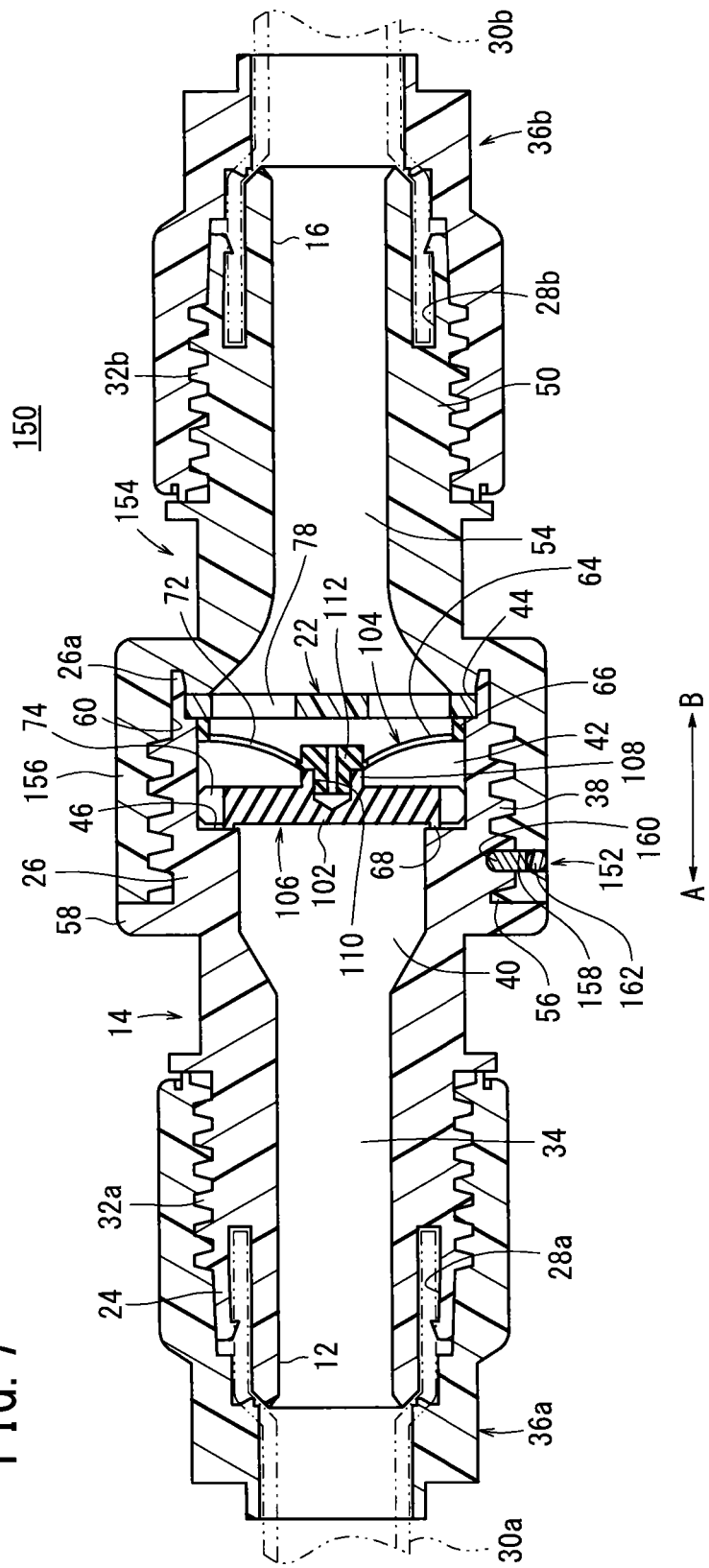
FIG. 7 is an overall cross sectional view of a check valve according to a third embodiment of the present invention.

Next, a check valve 150 according to a third embodiment is shown in FIG. 7. Structural elements thereof, which are the same as those in the check valve 100 according to the second embodiment, are designated with the same reference characters, and detailed explanations of such features are omitted.

As shown in FIG. 7, the check valve 150 according to the third embodiment differs from the check valve 100 according to the second embodiment in that, when connection is carried out between the first connecting section 26 of the first body 14 and the second connecting section 156 of the second body 154, not only are the first and second connecting sections 26, 156 connected together mutually by screw-engagement, but additionally, the first and second connecting sections 26, 156 are connected together using a loosening prevention mechanism 152.

The loosening prevention mechanism 152 utilized by the check valve 150 includes a penetrating hole 158 that penetrates from the outer circumferential surface toward the inner circumferential side of the second connecting section 156 of the second body 154, a latch pin 160 that is inserted into the penetrating hole 158 and fitted in engagement with the male screw portion 38 of the first body 14, and a sealing ball 162, which is press-inserted into the penetrating hole 158 to prevent dropping out of the latch pin 160.

The penetrating hole 158 is formed at a position facing a valley area of the male screw portion 38 on the first connecting section 26 when the first body 14 and the second body 154 are connected together. The latch pin 160 is inserted into the penetrating hole 158 from the outer circumferential side of the second body 154, and the sealing ball 162 is press-inserted onto an outer circumferential side of the latch pin 160.

The latch pin 160 is formed, for example, from a metal material in the shape of a shaft having a substantially constant diameter, the distal end thereof having a shape that corresponds to the valley area of the male screw portion 38. The sealing ball 162 is formed, for example, from a resin material, having a slightly larger diameter than the inner circumferential diameter of the penetrating hole 158.

In addition, after the first connecting section 26 of the first body 14 and the second connecting section 156 of the second body 154 have been screw-engaged and connected together mutually, the latch pin 160 is inserted through the penetrating hole 158 from the outer circumferential side of the second connecting section 156, and the distal end thereof is engaged with the male screw portion 38 on the first body 14, together with the sealing ball 162 being press-inserted with respect to the penetrating hole 158. Incidentally, the sealing ball 162 is inserted into the penetrating hole 158 without protruding from the end face of the penetrating hole 158.

In this manner, according to the third embodiment, by screw-engagement of the male screw portion 38 of the first connecting section 26 and the female screw portion 56 of the second connecting section 156, after the first body 14 and the second body 154 have been connected together, the latch pin 160 is inserted through the penetrating hole 158 formed in the second connecting section 156 and is fitted in engagement with respect to the first connecting section 26. Consequently, relative displacement between the first connecting section 26 and the second connecting section 156 in the axial direction (the direction of arrows A and B) can reliably be prevented. As a result, for example, even in the case that the check valve 150 is used in an environment subject to vibrations or the like, loosening of the connection between the first body 14 and the second body 154 can reliably be prevented by the loosening prevention mechanism 152, and the check valve 150 can be used in a more stable manner.

Further, in the penetrating hole 158, by press-insertion of the sealing ball 162 on the outer circumferential side of the latch pin 160, displacement of the latch pin 160 in the penetrating hole 158 is restricted, so that the state of engagement between the first body 14 and the second body 154 by the latch pin 160 can reliably be maintained, and falling out of the latch pin 160 from the penetrating hole 158 can reliably be prevented. Furthermore, by a simple operation merely of press-inserting the sealing ball 162 into the penetrating hole 158, a favorable condition is brought about in which movement or falling out of the latch pin 160 is reliably prevented.

The check valve according to the present invention is not limited to the aforementioned embodiments, and it is a matter of course that various additional or modified structures may be adopted therein without deviating from the essential gist of the present invention.

What is claimed is:

1. A check valve comprising:
a first body having a first port to which a pressure fluid is supplied to a flow passage therein;
a second body connected to the first body and having a second port from which the pressure fluid is discharged from a flow passage therein, wherein at least one of the first body and the second body form a communication chamber through which the pressure fluid can flow from the flow passage in the first body to the flow passage in the second body;
a valve plug disposed in the communication chamber and being movable to switch a state of communication between the flow passages in the respective first and second bodies through which the pressure fluid flows, wherein the valve plug includes a seating section to be seated on the valve seat, an outer circumferential surface of the valve plug formed at an outer circumferential side of the seating section having a diameter substantially the same as that of an inner circumference of the communication chamber, and cutout portions being cut out from the outer circumferential surface of the valve plug having the diameter substantially the same as that of an inner circumference of the communication chamber, to permit the passage of the pressure fluid through the cutout portions;
a retaining member retained on the second body; and
a sheet-like elastic member joined to the retaining member and urging the valve plug in a direction toward a valve seat formed in the first body so as to seat the valve plug on the valve seat, and away from the second body, wherein the sheet-like elastic member is provided with holes through which the pressure fluid can flow.

2. The check valve according to claim 1, wherein the elastic member is formed integrally with the valve plug.

3. The check valve according to claim 1, wherein the elastic member is formed separately from the valve plug and is disposed detachably with respect to the valve plug.

4. The check valve according to claim 1, wherein the first and second bodies, the valve plug, and the elastic member are formed respectively from resin materials.

5. The check valve according to claim 1, wherein the first body and the second body are connected together by mutual screw-engagement of screw portions formed respectively therein, the screw portions being formed as trapezoidal screws.

6. The check valve according to claim 1, wherein a loosening prevention mechanism is provided at a connection region between the first body and the second body for preventing loosening of a screw-engaged condition of the first body and the second body.

7. The check valve according to claim 6, wherein the loosening prevention mechanism includes a latch pin, which is inserted for engagement in a direction perpendicular to the axis of the first and second bodies.

8. The check valve according to claim 1, wherein a projection, which projects in a radial outward direction, is formed on an outer circumferential surface of an end portion of either one of the first body or the second body, and a groove into which the end portion is press-fitted is formed on either one of the second body or the first body, which is opposite to the first body or the second body on which the projection is provided.

9. The check valve according to claim 1, wherein the elastic member is formed with a curved shape in cross section.

* * * * *